(12) United States Patent
Kim et al.

(10) Patent No.: US 8,417,845 B2
(45) Date of Patent: Apr. 9, 2013

(54) METHOD AND APPARATUS TRANSFERRING DATA VIA UNIVERSAL SERIAL BUS

(75) Inventors: Chong-sok Kim, Seongnam-si (KR); Hyun-duk Cho, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 416 days.

(21) Appl. No.: 12/796,901

(22) Filed: Jun. 9, 2010

(65) Prior Publication Data
US 2010/0318714 A1    Dec. 16, 2010

(30) Foreign Application Priority Data
Jun. 10, 2009    (KR) .................. 10-2009-0051516

(51) Int. Cl.
*G06F 13/28*    (2006.01)
(52) U.S. Cl. ............. 710/27; 710/22; 710/308; 710/305
(58) Field of Classification Search .................. 710/105, 710/301, 305, 306, 315, 27, 22, 308; 711/103, 711/154, 156
See application file for complete search history.

(56) References Cited

U.S. PATENT DOCUMENTS

| | | | |
|---|---|---|---|
| 5,884,093 A * | 3/1999 | Berenguel et al. ................ 710/1 |
| 6,115,771 A * | 9/2000 | Born ............................... 710/315 |
| 6,871,244 B1 * | 3/2005 | Cahill et al. ..................... 710/62 |
| 6,874,044 B1 * | 3/2005 | Chou et al. ...................... 710/62 |
| 6,886,083 B2 * | 4/2005 | Murakami ..................... 711/156 |
| 6,948,025 B2 * | 9/2005 | Yoshida ........................ 710/315 |
| 6,965,956 B1 * | 11/2005 | Herz et al. ...................... 710/74 |
| 6,973,658 B2 * | 12/2005 | Nguyen ......................... 719/327 |
| 6,993,618 B2 * | 1/2006 | Chen et al. .................... 710/305 |
| 7,054,981 B2 * | 5/2006 | Fadell et al. .................. 710/305 |
| 7,073,010 B2 * | 7/2006 | Chen et al. .................... 710/313 |
| 7,222,211 B2 * | 5/2007 | Lee et al. ...................... 710/315 |
| 7,412,553 B2 * | 8/2008 | Morrow ........................ 710/305 |
| 7,424,580 B2 * | 9/2008 | Fujita et al. ................... 711/154 |
| 7,680,974 B2 * | 3/2010 | Brewer et al. ................. 710/301 |
| 7,925,812 B2 * | 4/2011 | Konno et al. ................. 710/301 |
| 8,001,304 B2 * | 8/2011 | Yung et al. ...................... 710/74 |
| 8,037,229 B2 * | 10/2011 | Zer et al. ....................... 710/308 |
| 8,037,234 B2 * | 10/2011 | Yu et al. ........................ 711/103 |
| 8,041,855 B1 * | 10/2011 | Ou et al. ......................... 710/35 |
| 8,078,788 B2 * | 12/2011 | Chang et al. .................. 710/315 |
| 2004/0027879 A1 * | 2/2004 | Chang .......................... 365/200 |

(Continued)

FOREIGN PATENT DOCUMENTS

| | | |
|---|---|---|
| JP | 2006330831 A | 12/2006 |
| KR | 1020030088733 A | 11/2003 |
| KR | 1020030093417 A | 12/2003 |

OTHER PUBLICATIONS

ST Ericsson. Low-power USB peripheral controller with DMA. Product Data sheet. Rev. 04. Sep. 29, 2009.*
Compaq et al. Universal Serial Bus Specification. Revision 2.0. Apr. 27, 2000.*

(Continued)

*Primary Examiner* — Matthew D Spittle
(74) *Attorney, Agent, or Firm* — Volentine & Whitt, PLLC

(57) ABSTRACT

A method of communicating data between an external storage device and a USB host via a USB device is disclosed. The method includes receiving data from the USB host; and either (1) directly communicating the received data to the external storage device via an exclusive bus, or (2) indirectly communicating the received data to the external storage device via a USB bus, separate from the exclusive bus.

16 Claims, 3 Drawing Sheets

U.S. PATENT DOCUMENTS

2004/0153597 A1* 8/2004 Kanai et al. .................. 710/305
2004/0205280 A1* 10/2004 Jeansonne et al. ............ 710/306
2005/0138288 A1* 6/2005 Chou et al. ................... 711/115
2008/0235410 A1* 9/2008 Koh .............................. 710/23
2008/0320214 A1* 12/2008 Ma et al. ...................... 711/103

OTHER PUBLICATIONS

Texas Instruments. TAS1020A USB Streaming Controller. Data Manual. Dec. 2001.*

* cited by examiner

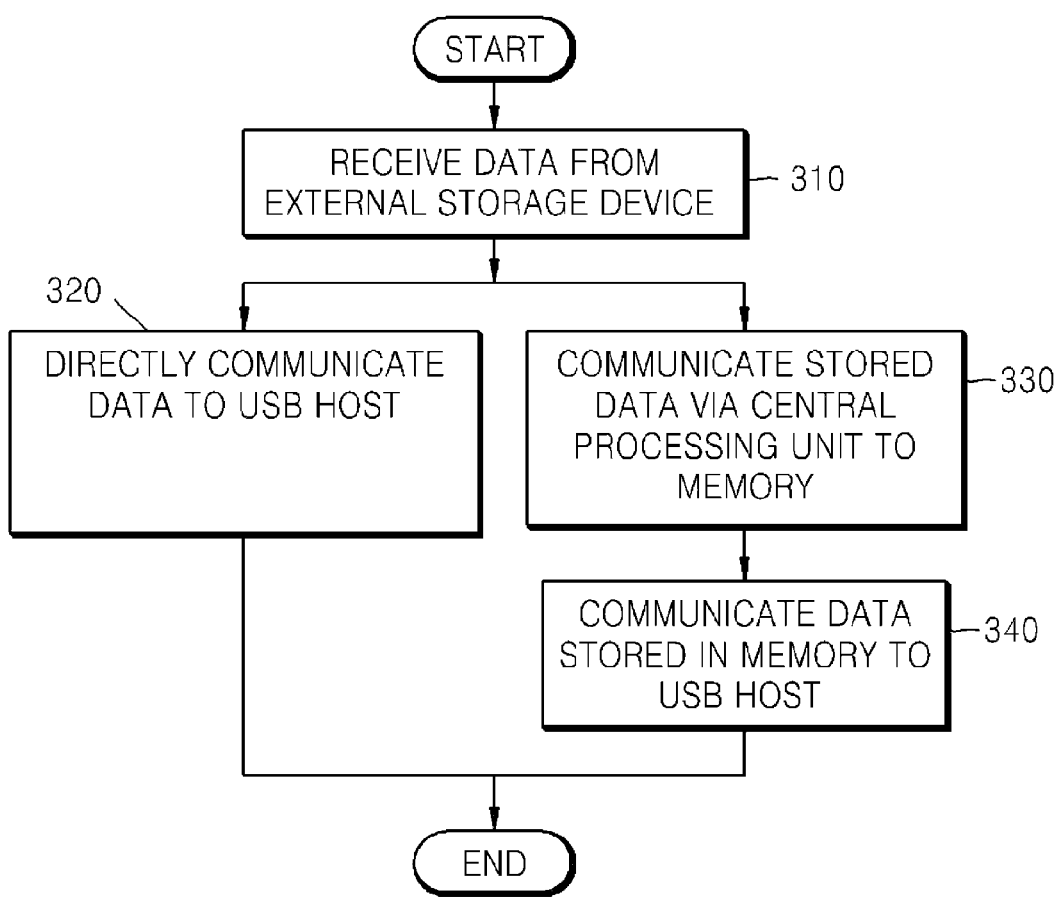

METHOD AND APPARATUS TRANSFERRING DATA VIA UNIVERSAL SERIAL BUS

CROSS-REFERENCE TO RELATED APPLICATION

This application claims the benefit of Korean Patent Application No. 10-2009-0051516 filed on Jun. 10, 2009, the subject matter of which is hereby incorporated by reference.

BACKGROUND

The inventive concept relates to a data transmission method and apparatus using a universal serial bus (USB). More particularly, the inventive concept relates to a data transmission method and apparatus in which data transmission speed is increased using a USB.

A USB is a hardware component (controlled by a corresponding data communication protocol) commonly used to provide a data connection between a so-called "USB host" (e.g., a computer) and a connected "USB device" (e.g., a memory stick, disc drive, digital camera, web cam, keyboard, mouse, game pad, joystick, scanner, printer, personal digital assistant (PDA), etc). Recently, the USB has commercially replaced other types of serial and parallel connection components, and ongoing research is focused on increasing the speed of data exchange via the USB.

SUMMARY

Embodiments of the inventive concept provide methods and apparatuses transferring data via a Universal Serial Bus (USB) at improved speed.

According to an aspect of the inventive concept, there is provided a Universal Serial Bus (USB) device, comprising; a data transmission controller configured to directly communicate data between a USB host and an external storage device using an exclusive bus connecting the data transmission controller and an external storage device controller associated with the external storage device, and a USB controller configured to communicate data between the USB host and the external storage device using a USB bus, separate from the exclusive bus, and connecting the USB controller, the external storage device controller, a memory external to the USB device, and a central processing unit (CPU) internal to the USB device.

According to an aspect of the inventive concept, there is provided a method of communicating data between an external storage device and a USB host via a USB device, the method comprising; receiving data from the USB host; and either (1) directly communicating the received data to the external storage device via an exclusive bus, or (2) indirectly communicating the received data to the external storage device via a USB bus, separate from the exclusive bus.

BRIEF DESCRIPTION OF THE DRAWINGS

Embodiments of the inventive concept will be more clearly understood from the following detailed description taken in conjunction with the accompanying drawings in which:

FIG. 3 is a flowchart summarizing a method of communicating data stored in an external storage device to a USB host via a USB device according to an embodiment of the inventive concept.

DETAILED DESCRIPTION OF THE EMBODIMENTS

Embodiments of the inventive concept will now be described with reference to the attached drawings. However, the inventive concept may be variously embodied and should not be construed as being limited to only the illustrated embodiments.

Figure 1:
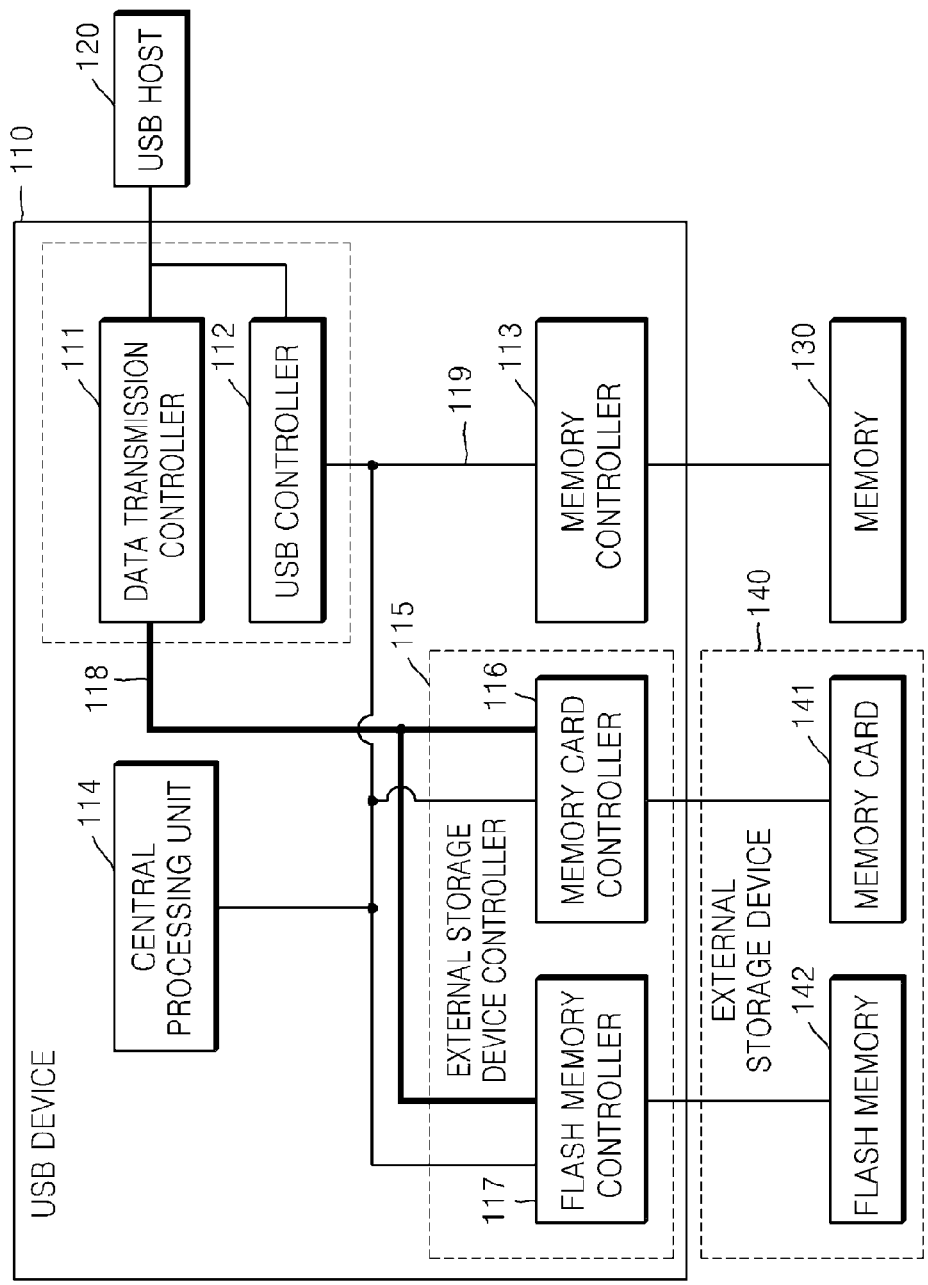
FIG. 1 is a block diagram illustrating a Universal Serial Bus (USB) device according to an embodiment of the inventive concept.

Figure (FIG.) 1 is a block diagram illustrating a universal serial bus (USB) device according to an embodiment of the inventive concept. Referring to FIG. 1, a USB device 110 comprises a data transmission controller 111, a USB controller 112, a memory controller 113, a central processing unit (CPU) 114, and an external storage device controller 115, and the external storage device controller 115 includes a flash memory controller 116 and a memory card controller 117.

The data transmission controller 111 is connected to an interface (not shown) of an external USB host 120. When storing data received from the USB host 120 in an external storage device 140, the data transmission controller 111 communicates data from the USB host 120 via the interface.

An exclusive line (or "exclusion bus") 118 connected between the data transmission controller 111 and the external storage device controller 115 is included in the USB device 110. That is, the exclusive bus 118 is "exclusively connected" between the external storage device controller 115 and the data transmission controller 111 without also being connected to the CPU 114 and memory controller 113. When the data transmission controller 111 communicates data, the data may be directly and exclusively communicated to the external storage device controller 115 without passing through (or otherwise being applied) to the memory controller 113 or corresponding memory 130 before being transferred to the external storage device controller 115. In other words, the data may be "directly communicated" from the data transmission control 111 exclusively to the external storage device controller 115 via the exclusive bus.

When storing the data received from the USB host 120 in the external storage device 140, the USB device 110 stores data using management routine of a constituent file system which may be part of an operating system (OS) ported to the CPU 114. The file system may be used to store, search, access, and/or manipulate data, and is designed such that data is stored in an external storage device. Examples of possible file system types that might be used in this context include a file allocation table (FAT) and a new technology file system (NTFS). Currently, a FAT is used in most mobile electronic devices.

According to an embodiment of the inventive concept, in order for the data transmission controller 111 to transmit data directly to the external storage device controller 115 without passing through the CPU 114 via the USB device 110, the data transmission controller 111 must also be able to control the file system. Accordingly, an operating system including a file system may be additionally ported to the data transmission controller 111. In certain embodiments of the inventive concept, the operating system only needs to include the file system. Also, the data transmission controller 111 only needs to control the file system. The logic for controlling the file system may be realized as a hard-wired logic or using another CPU different from the CPU 114 for controlling only the file system.

The external storage device controller 115 controls the storage of data communicated from the data transmission controller 111 in the external storage device 140. The external storage device 140 may be, for example, a memory card 141 and a flash memory 142, but may be any type of external storage device capable of receiving data via the USB.

Alternatively, data may be stored in the external storage device 140 using methods other than the above-described approach.

In contrast to the exclusive bus 118, a USB bus 119 connects the USB controller 112, the memory controller 113, the CPU 114, and the external storage device controller 115.

The USB controller 112 is connected to the interface of the USB host 120 that is external to the USB device 110. When storing data from the USB host 120 in the external storage 140, the USB controller 112 first receives the data from the USB host 120 via this interface. Data may be received by the USB controller 112 from the data transmission controller 111 and the USB host 120 at the same time. Alternatively, the data transmission controller 111 may be included in the USB controller 112, or the data transmission controller 111 and the USB controller 112 may be connected to each other.

The memory controller 113 receives data from the USB controller 112 and stores the data in the memory 130. For example, the memory 130 may be a dynamic random access memory (DRAM).

After reading data stored in the memory 130, the CPU 114 communicates the data to the external storage device controller 115. An operating system is ported to the CPU 114 to control the USB device 110, and a file system for controlling data storage is included as part of the operating system.

The external storage device controller 115 stores the data communicated from the memory controller 113 in the external storage device 140. In this case, the external storage device controller 115 may directly receive data from the data transmission controller 111 or receive data stored in the memory 130 from the memory controller 113. In this case, the external storage device controller 115 may selectively store data in the external storage device 140. Preferably, storage priority may be given when data is directly received from the data transmission controller 111. In this case, the external storage device controller 115 stores the data directly received from the data transmission controller 111, in the external storage device 140.

Figure 2:
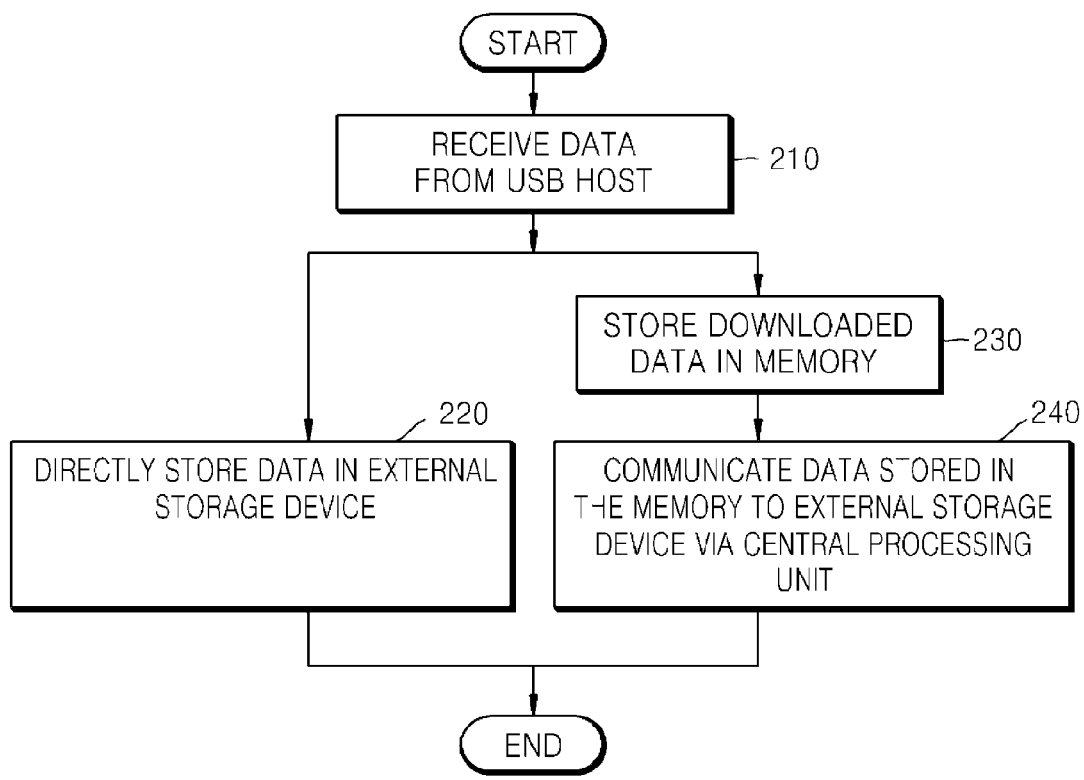
FIG. 2 is a flowchart summarizing a method of communicating data from a USB host and storing the data to an external storage device according to an embodiment of the inventive concept.

FIG. 2 is a flowchart summarizing a method of communicating and storing data in an external storage device by using a USB device according to an embodiment of the inventive concept.

Data received from the USB host 120 via the USB device 110 may be stored in the external storage device 140 using two different approaches. One approach includes the illustrated operations 210 and 220, and the other approach includes the illustrated operations 210, 230, and 240.

Referring to FIG. 2, both approaches begin with the USB device 110 receiving data from the USB host 120 (210).

Following the first approach, the USB device 110 directly stores received data in the external storage device 140 without having the data pass through the CPU 114 (220). Using this approach, the received data is not stored in (and does not pass through) memory 130 connected to the USB device 110 before being communicated to the external storage device 140.

Alternately, following receipt by the USB device 110 of data from the USB host 120 (210), the USB device 110 may store the received data in the memory 130 connected to the USB device 110 (230). Then, the USB device 110 may communicate the data stored in the memory 130 to the external storage device 140 via the CPU 114. This second approach may be thought of as indirectly storing the received data in the external storage device 140 via the memory 130 and CPU 114. A USB device according to an embodiment of the inventive concept may selectively use either one of these two approaches (direct and indirect) to communicate and store data. Preferably, priority will be given to the direct approach of storing data without passing the data through the memory and the CPU.

Hereinafter, an apparatus and method for communicating data stored in the external storage memory to the USB host 120 via the USB device 110 will be described. Here again, the USB device 110 is assumed to have the structure illustrated in FIG. 1.

FIG. 3 is a flowchart summarizing a method of communicating data stored in an external storage device to a USB host using a USB device according to an embodiment of the inventive concept.

Similar to the foregoing, data stored in the external storage device 140 may be communicated to the USB host via the USB device using two distinct approaches. One approach includes operations 310 and 320, and the other approach includes operations 310, 330, and 340.

Referring to FIG. 3, the USB device 110 first receives data from the external storage device 140.

Following the first approach, the USB device 110 directly communicates the received data to the USB host (320), without the data passing through the memory 130 or the CPU 114.

Following the second approach, the CPU 114 that operates in the USB device 110 to first communicate data stored in the external storage device 140 to the memory connected to the USB device (330), and then further communicates the data from the memory 130 to the USB host 120 via the CPU 114.

The USB device 110 may selectively use either one of these two (direct and indirect) methods for communicating data from the external storage device 140 to the USB host 120. Preferably, priority will be given to the direct approach, such that data need not pass through the memory 130 and CPU 114.

While this inventive concept has been particularly shown and described with reference to exemplary embodiments thereof, it will be understood by those of ordinary skill in the art that various changes in form and details may be made therein without departing from the scope of the inventive concept as defined by the appended claims. The exemplary embodiments should be considered in descriptive sense only and not for purposes of limitation. Therefore, the scope of the inventive concept is not limited to only the detailed description of the inventive concept, but by the appended claims.

What is claimed is:

1. A Universal Serial Bus (USB) device, comprising:
a data transmission controller configured to directly communicate data between a USB host and an external storage device controller associated with an external storage device using a first, exclusive, bus which is directly connected only to the data transmission controller and to the external storage device controller; and
a USB controller configured to communicate data between the USB host and the external storage device controller using a second, shared, bus, separate from the exclusive bus, wherein the second, shared, bus is directly connected to: the USB controller, the external storage device controller, a memory controller associated with a memory which is external to the USB device, and a central processing unit (CPU).

2. The USB device of claim 1, further comprising the CPU, wherein the CPU is configured to indirectly communicate the data between the USB host and the external storage device using the second, shared, bus by first communicating the data from the USB host to the memory which is external to the USB device, and then communicating the data from the memory which is external to the USB device to the external storage device.

3. The USB device of claim 2, wherein the USB device is configured to select between direct communication of the data via the first, exclusive, bus and indirect communication of the data via the second, shared, bus.

4. The USB device of claim 3, wherein the selection between the direct communication and the indirect communication gives priority to the direct communication.

5. The USB device of claim 3, wherein the data transmission controller is part of the USB controller.

6. The USB device of claim 1, wherein the memory is a random access memory.

7. The USB device of claim 1, wherein the external storage device comprises at least one of a flash memory device and a memory card.

8. The USB device of claim 7, wherein the external storage device comprises a flash memory device and a memory card, and the external storage device controller comprises a flash memory controller and a memory card controller.

9. The USB device of claim 8, wherein each one of the flash memory controller and the memory card controller is separately connected to the first, exclusive, bus and to the second, shared, bus.

10. A method of communicating data between an external storage device and a USB host via a USB device, the method comprising:
receiving data at the USB device from the USB host; and selectively:
(1) directly communicating the received data from a data transmission controller of the USB device to an external storage device controller associated with the external storage device via a first, exclusive bus which is directly connected only to the data transmission controller and the external storage device, or
(2) indirectly communicating the received data from a USB controller of the USB device to the external storage device controller via a second, shared, bus, separate from the exclusive bus, where the second shared bus is directly connected to: the USB controller, the external storage device controller, a memory controller associated with a memory which is external to the USB device, and a central processing unit (CPU).

11. The method of claim 10, wherein indirectly communicating the received data to the external storage device via the second, shared, bus comprises first communicating the data from the USB host to the memory which is external to the USB device, and then communicating the data from the memory to the external storage device.

12. The method of claim 11, wherein either the direct or indirect communication is selected by the USB device with priority being given to selection of the direct communication.

13. The USB device of claim 1, further comprising the CPU, the memory controller, and the external memory device controller, and wherein the external memory device controller comprises a flash memory controller and a memory card controller, wherein each one of the flash memory controller and the memory card controller is separately connected to the first, exclusive, bus and to the second, shared, bus.

14. A method of communicating data between an external storage device and a USB host via a USB device, the method comprising:
receiving data at the USB device from the external storage device; and selectively:
(1) directly communicating the received data from an external storage device controller associated with the external storage device to a data transmission controller of the USB device via a first, exclusive bus which is directly connected only to the data transmission controller and the external storage device, or
(2) indirectly communicating the received data from the external storage device controller to a USB controller of the USB device via a second, shared, bus, separate from the exclusive bus, where the second shared bus is directly connected to: the USB controller, the external storage device controller, a memory controller associated with a memory which is external to the USB device, and a central processing unit (CPU).

15. The method of claim 14, wherein indirectly communicating the received data to the external storage device via the second, shared, bus comprises first communicating the data from the USB host to the memory which is external to the USB device, and then communicating the data from the memory to the external storage device.

16. The method of claim 14, wherein either the direct or indirect communication is selected by the USB device with priority being given to selection of the direct communication.

* * * * *